Figure 4:
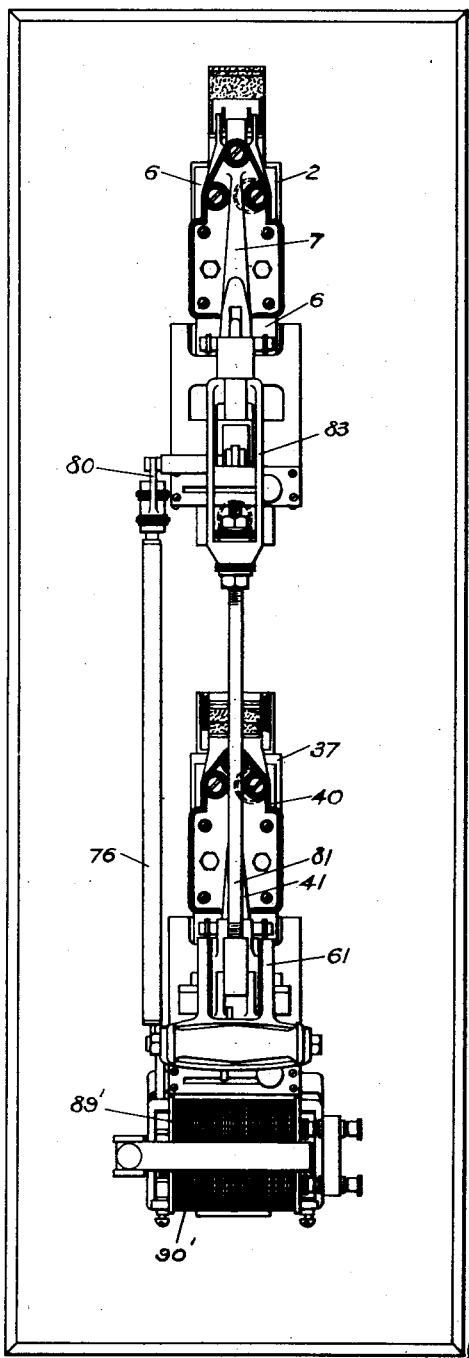

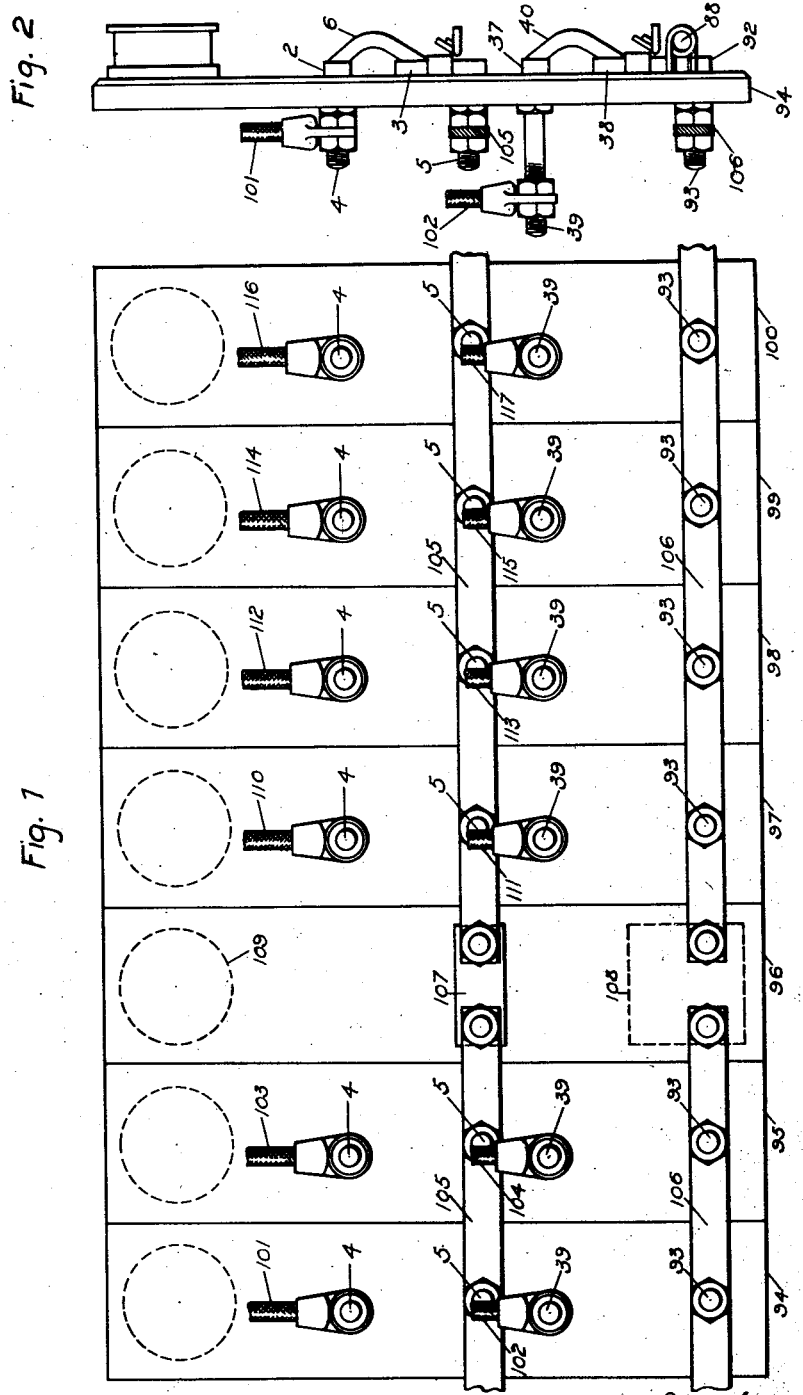

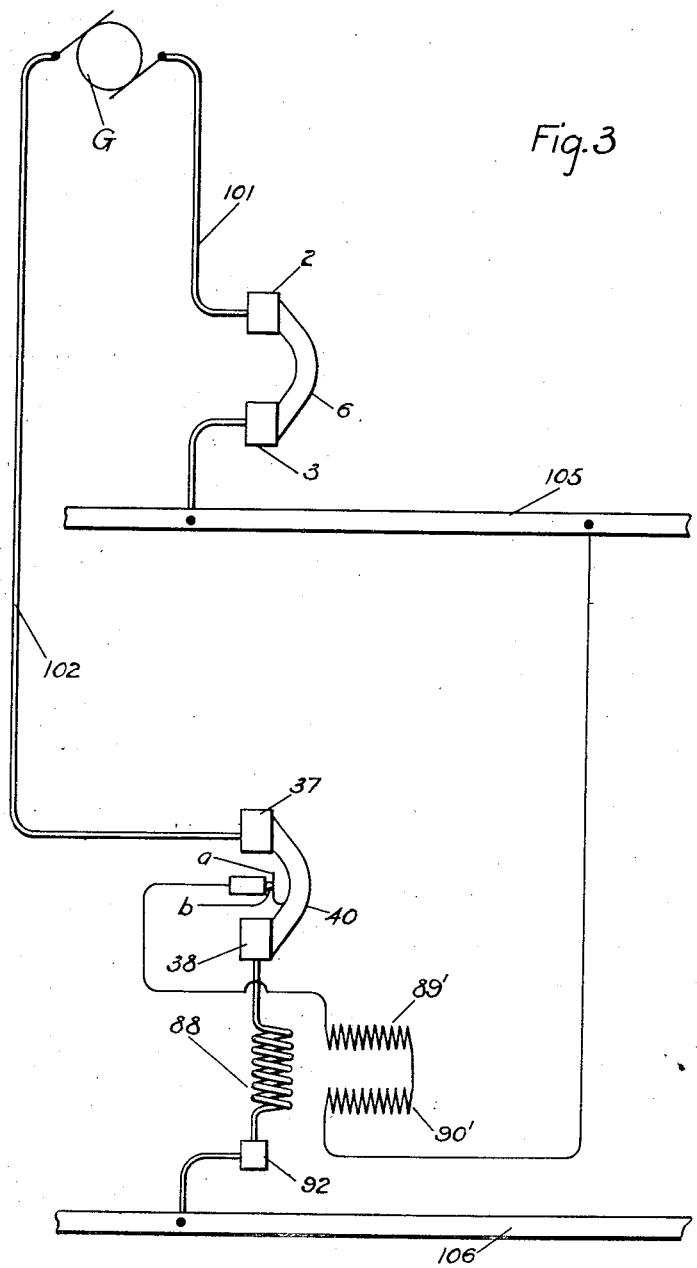

W. M. SCOTT.
SWITCHBOARD CONSTRUCTION.
APPLICATION FILED NOV. 9, 1909.

962,473.

Patented June 28, 1910.
3 SHEETS—SHEET 3.

UNITED STATES PATENT OFFICE.

WILLIAM M. SCOTT, OF PHILADELPHIA, PENNSYLVANIA, ASSIGNOR TO THE CUTTER ELECTRICAL AND MANUFACTURING COMPANY, A CORPORATION OF NEW JERSEY.

SWITCHBOARD CONSTRUCTION.

962,473.  Specification of Letters Patent.  Patented June 28, 1910.

Original application filed March 1, 1905, Serial No. 247,914. Divided and this application filed November 9, 1909. Serial No. 526,969.

*To all whom it may concern:*

Be it known that I, WILLIAM M. SCOTT, a citizen of the United States, residing at Philadelphia, in the county of Philadelphia and State of Pennsylvania, have invented a new and useful switchboard Construction, of which the following is a specification.

My invention relates to switchboard construction, and particularly to the construction of switchboards used in connection with electric lighting, electric power transmission, and kindred systems in which heavy electric currents are employed.

My invention resides in switchboard construction for the purposes above stated in which the electric switches or circuit breakers or kindred apparatus and the heavy bus bars or other conductors are so related as to afford great economy of space and to simplify the bus bar and heavy connections upon the rear of the switchboard, particularly in avoiding or minimizing heavy jumpers or cross-overs.

My invention resides in other features hereinafter described and claimed.

For an illustration of one of the forms my invention may take, reference is to be had to the accompanying drawings, in which:

Figure 1 is an elevational view of the rear of a switchboard showing bus bar and feeder connections. Fig. 2 is a side elevational view of the switchboard shown in Fig. 1. Fig. 3 is a diagrammatic view of a circuit arrangement. Fig. 4 is a front elevational view of two inter-connected circuit breakers employed in the switchboard construction of my invention.

In Figs. 1 and 2 there are shown seven switchboard panels, 94 and 95 being generator panels, 96 the ammeter and wattmeter panel, while 97, 98, 99 and 100 are feeder or distribution panels. Leads or conductors 101 and 102 extend from a generator to the panel 94, while the leads 103 and 104 extend from another generator to the panel 95. Heavy bus bars 105 and 106 extend transversely across all of the panels, the bus bar 105 being interrupted at the panel 95 for the insertion of the main ammeter shunt 107, and the bus bar 106 being interrupted at panel 95 for the insertion of the main wattmeter 108. The ammeter 109 is on the front of the switchboard and has terminals connected to the terminals of the shunt 107.

On each of the panels 94, 95, and 97 to 100 inclusive is mounted a double circuit breaker such as shown and described in my prior application Serial No. 247,914, filed March 1, 1905. Such a double circuit breaker is shown in front elevation in Fig. 4 and comprises an upper circuit breaker having the main terminal blocks 2 and 3 bridged by the laminated bridging member 6, while the lower breaker comprises the main terminals 37 and 38 adapted to be bridged by the laminated bridging member 40. The operating members of the circuit breakers are mechanically connected by rod 81 and the tripping mechanisms are connected by the vertically extending rod 76. Each breaker may have its own tripping mechanism, the lower breaker having the potential or shunt coils 89' and 90' coöperating with the series winding 88 to trip the breaker upon the occurrence of reversed current or reversed energy flow. And each of the breakers may be provided in addition with an ordinary overload tripping device.

As seen in Fig. 3, the upper breaker is adapted to interrupt the conductor 101 leading from the generator G to the bus bar 105, while the lower breaker is adapted to interrupt the conductor 102 extending from the other terminal of the generator G to the bus bar 106. It is thus seen that there is a breaker in each side of the circuit leading from the generator G, the upper and lower breakers being adapted to completely isolate the generators G from the bus bars 105 and 106.

Referring to panel 94, for example, the generator lead 101 connects with the bolt or stud 4 of the upper switch or circuit breaker, and the lead 102 connects with the stud or bolt 39 of the lower switch or circuit breaker of the pair. The bolt or stud of the upper switch or circuit breaker connects with the bus bar 105 and the stud or bolt 93 of the lower switch or circuit breaker connects with the bus bar 106. Feeders 110 and 111, at panel 97, connect with a distribution circuit to be supplied from the bus bars 105 and 106. A double circuit breaker is connected as described in connection with panel 94, so as to interrupt both sides of said distribution circuit, and by the arrangement shown to minimize cross-overs on the switchboard and to simplify the construction. Similarly, 112 and 113 are feeders extending from panel 98; 114 and 115 are feeders extending from panel 99; and 116 and 117 are feeders extending from panel 100, each generator panel and each feeder panel being supplied in the usual way with its ammeter indicated at the top of each panel by dotted lines as shown in Fig. 1.

From the foregoing description, it is apparent that all cross-overs of heavy conductors are obviated by the arrangement of one switch or breaker above another and that the construction generally is simplified.

This application is a division of my prior application Serial No. 247,914.

What I claim is:

1. In combination, a switchboard, bus bars extending across the same, circuit leads, and a plurality of electric switches mounted upon said switchboard and disposed one vertically above another, the movable contact member of each switch serving to connect a lead with a bus bar, and an upper terminal of a lower switch disposed below an upper bus bar.

2. In combination, a switchboard, bus bars extending across the same, circuit leads, and a plurality of automatic circuit breakers mounted upon said switchboard and disposed one above another, the movable contact member of each circuit breaker serving to connect a lead with a bus bar, and an upper terminal of a lower circuit breaker disposed below an upper bus bar.

3. In combination, a switchboard, bus bars extending across the same, circuit leads, a plurality of automatic circuit breakers mounted upon said switchboard and disposed one above another, the movable contact member of each circuit breaker serving to connect a lead with a bus bar, an upper terminal of a lower breaker disposed below an upper bus bar, and the movable contact members of said breakers being mechanically interconnected.

4. In combination, a switchboard, bus bars extending across the same one above the other, switches mounted one vertically above the other on said switchboard, the movable contact members of said switches in substantial vertical alinement, one terminal of each switch connected to one of said bus bars, and the other terminal of each switch connected to a circuit lead.

5. In combination, a switchboard, bus bars extending across the same one above the other on one side of said switchboard, switches disposed one vertically above the other on the other side of said switchboard, the movable contact members of said switches in substantial vertical alinement, a connection from a terminal of each switch through said switchboard to a bus bar, and the other terminal of each switch connected to a circuit lead.

6. In combination, a switchboard, bus bars extending across the same on one side thereof, switches disposed one above the other upon the other side of said switchboard, the terminals of said switches being disposed in substantially vertical alinement, a terminal of each switch connected through said switchboard to a bus bar, the upper terminal of a lower switch being disposed below an upper bus bar.

7. In combination, a switchboard, bus bars extending across the same and disposed one above another, switches mounted one above another on said switchboard, one terminal of each switch connected to one of said bus bars, and the other terminal of each switch connected to a circuit lead, said switch terminals being disposed in substantial vertical alinement, whereby a cross-over or jumper connection is avoided.

8. In combination, a switchboard, bus bars extending across the same on one side thereof, switches mounted upon the other side of said switchboard, said switches and bus bars connected in the same circuit, each switch connected to a circuit lead and to a bus bar, the terminals of said switches being disposed in substantial vertical alinement with respect to said bus bars, whereby a cross-over or jumper connection is avoided.

9. In combination, a switchboard, bus bars extending across the same one above another on one side of said switchboard, switches mounted one above another on the other side of said switchboard, circuit leads on the same side of said switchboard with said bus bars, the terminals of a switch connecting respectively with a bus bar and a circuit lead, the terminals of said switches being so disposed in substantial vertical alinement that a jumper or cross-over connection is avoided.

10. In combination, a switchboard, bus bars extending across the same and disposed one above another, circuit leads, a plurality of switches mounted upon said switchboard and disposed one above another, the movable contact member of each switch serving to connect a circuit lead with a bus bar and disposed in substantial vertical alinement with the movable contact member of another of said switches, and a mechanical connection between the movable contact members of said switches.

11. In combination, a plurality of switchboard panels disposed side by side, bus bars extending across said panels and disposed one above the other, switches mounted upon one of said panels one above the other, a terminal of each switch connecting with a bus bar, and the other terminal of each switch connecting with the circuit lead.

12. In combination, a plurality of switchboard panels disposed side by side, bus bars extending across said panels and disposed one above the other, switches mounted upon one of said panels with their terminals in substantial vertical alinement, one terminal of each switch connected to one of said bus bars, and the other terminal of each switch connected to a circuit lead.

13. Switchboard construction comprising a plurality of generator and feeder panels disposed side by side, bus bars disposed one above the other and extending across said panels, generator switches disposed upon a panel one above the other, generator leads, a terminal of each generator switch connected with a generator lead, and the other terminal of each generator switch connected to a bus bar, and feeder switches upon a panel disposed one above the other, circuit leads, a terminal of each of said feeder switches connected to a circuit lead, and the other terminal of said feeder switches connected to a bus bar.

14. Switchboard construction comprising generator and feeder panels, bus bars disposed one above the other and extending straight across said panels, and feeder and generator switches connecting directly with said bus bars.

15. In combination, a switchboard, bus bars extending across the same, circuit leads, a plurality of electric switches mounted upon said switchboard and disposed one vertically above another and connected in series in the same circuit, the movable contact member of each switch serving to connect a lead with a bus bar, and an upper terminal of a lower switch disposed below an upper bus bar.

16. In combination, a switchboard, bus bars extending across the same, circuit leads, and a plurality of automatic circuit breakers mounted upon said switchboard and disposed one above the other, the movable contact member of each circuit breaker serving to connect a lead with a bus bar, said circuit breakers connected in series with each other, and a member mechanically inter-connecting the movable contact members of said circuit breakers.

In testimony whereof I have hereunto affixed my signature in the presence of the two subscribing witnesses.

WILLIAM M. SCOTT.

Witnesses:
   ANNA E. STEINBOCK,
   ELEANOR T. MCCALL.